United States Patent
Yoo

(10) Patent No.: US 12,227,240 B2
(45) Date of Patent: Feb. 18, 2025

(54) INDEPENDENT STEERING CONTROL APPARATUS AND METHOD

(71) Applicant: HYUNDAI MOBIS CO., LTD., Seoul (KR)

(72) Inventor: Sung Bem Yoo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 273 days.

(21) Appl. No.: 17/659,096

(22) Filed: Apr. 13, 2022

(65) Prior Publication Data
US 2023/0249743 A1 Aug. 10, 2023

(30) Foreign Application Priority Data
Feb. 7, 2022 (KR) .................. 10-2022-0015472

(51) Int. Cl.
*B62D 6/00* (2006.01)
*B62D 15/02* (2006.01)
*G07C 5/08* (2006.01)

(52) U.S. Cl.
CPC ........... *B62D 6/002* (2013.01); *B62D 15/021* (2013.01); *G07C 5/0816* (2013.01)

(58) Field of Classification Search
CPC .... B62D 6/002; B62D 15/021; B62D 5/0484; B62D 9/005; B62D 5/0481; B62D 7/148; B62D 7/159; B62D 6/00; B62D 5/046; G07C 5/0816; B60Y 2400/84

USPC .......................................................... 701/41
See application file for complete search history.

(56) References Cited

U.S. PATENT DOCUMENTS

2006/0009894 A1* 1/2006 Goto .................. B62D 6/003
701/41

FOREIGN PATENT DOCUMENTS

| DE | 10 2008 000365 | 8/2009 |
| KR | 10-1571629 | 11/2015 |
| KR | 10-2018084 | 9/2019 |
| KR | 10-2021-0119010 | 10/2021 |

OTHER PUBLICATIONS

Korean Office Action dated Dec. 18, 2022 issued in KR 10-2022-0015472.
German Office Action dated Nov. 30, 2022 issued in DE 10 2022 204 239.5.

* cited by examiner

*Primary Examiner* — Lindsay M Low
*Assistant Examiner* — Omar Morales
(74) *Attorney, Agent, or Firm* — DLA Piper LLP US

(57) ABSTRACT

An independent steering control apparatus may include: a processor configured to analyze whether wheels are abnormal, on the basis of turning angles of the respective wheels, and revise the turning angles of normal wheels except an abnormal wheel in which a fault occurred, according to the analysis result; and a wheel controller configured to control steering of the wheels according to the turning angles of the wheels, input from the processor.

18 Claims, 16 Drawing Sheets

INDEPENDENT STEERING CONTROL APPARATUS AND METHOD

CROSS-REFERENCE TO RELATED APPLICATION

This application claims priority from and the benefit of Korean Patent Application No. 10-2022-0015472, filed on Feb. 7, 2022, which is hereby incorporated by reference for all purposes as if set forth herein.

BACKGROUND

Field

Exemplary embodiments of the present disclosure relate to an independent steering control apparatus and method.

Discussion of the Background

Recently, in order to secure the degree of freedom in operation of a vehicle, research is being conducted on a technology for independently controlling steering of four wheels mounted on the vehicle. Examples of the operation of the vehicle include parallel driving (e.g. parallel parking), diagonal driving (e.g. diagonal parking), or pivot turning of the vehicle.

A two-wheel steering (or front-wheel steering) vehicle has two front wheels which are mechanically connected to each other through the Ackerman geometry model such that front-wheel steering is performed. In a four-wheel steering vehicle, however, four wheels are not mechanically connected to one another, and thus the angles of the respective wheels need to be independently controlled.

The 4-wheel steering vehicle is designed in such a manner that inscribed circles based on the steering angles of the respective wheels form a concentric circle, when the vehicle makes a turn. Thus, the turning radiuses of the respective wheels are constantly maintained. However, when a fault occurs in at least one of steering systems installed on the respective wheels, the centers of the inscribed circles based on the respective steering angles may not gather at one point. In this case, large lateral stress is applied to the vehicle made of a rigid body, thereby significantly degrading the structural stability of the vehicle, and having a fatal influence on the safety of a driver in the vehicle.

The related art of the present disclosure is disclosed in Korean Patent Application Publication No. 10-2021-0119010 published on Oct. 5, 2021 and entitled 'Control Method and System for Switching Driving Mode of Four-Wheel Independent Steering Type Vehicles and Its Switching Device.'

SUMMARY

Various embodiments are directed to an independent steering control apparatus and method which can adjust the turning angles of normal wheels except abnormal wheels, even though the turning angles of the abnormal wheels are fixed due to faults of the abnormal wheels, such that a vehicle can maintain an existing turning direction and an existing turning radius.

In an embodiment, an independent steering control apparatus may include: a processor configured to analyze whether wheels are abnormal, on the basis of turning angles of the respective wheels, and revise the turning angles of normal wheels except an abnormal wheel in which a fault occurred, according to the analysis result; and a wheel controller configured to control steering of the wheels according to the turning angles of the wheels, inputted from the processor.

When any one of front wheels is an abnormal wheel, the processor may revise the turning angle of a normal wheel of the front wheels.

The processor may acquire an additional turning angle by subtracting the turning angle of the abnormal wheel of the front wheels from the turning angle of the normal wheel of the front wheels, calculate a final central angle by adding the additional turning angle to the turning angle of the normal wheel of the front wheels, calculate a turning radius of the vehicle on the basis of the final central angle, and then revise the turning angle of the normal wheel of the front wheels by using the turning radius of the vehicle.

The processor may acquire an additional turning angle by subtracting the turning angle of the abnormal wheel of the rear wheels from the turning angle of the normal wheel of the rear wheels, calculate a final central angle by adding the additional turning angle to the turning angle of the normal wheel of the rear wheels, calculate a turning radius of the vehicle on the basis of the final central angle, and then revise the turning angle of the normal wheel of the rear wheels by using the turning radius of the vehicle.

When both of the rear wheels are abnormal wheels and any one of the front wheels is an abnormal wheel, the processor may calculate the turning angles of the abnormal rear wheels, and revise the turning angle of the normal wheel of the front wheels.

The processor may calculate the turning angle of a rear left wheel of the rear wheels on the basis of a turning radius of the rear left wheel, calculate the turning angle of a rear right wheel of the rear wheels on the basis of a turning radius of the rear right wheel, and calculate the turning angle of the rear wheels by averaging the turning angle of the rear left wheel and the turning angle of the rear right wheel.

The processor may decide whether the rear wheels are in-phase or out-of-phase, calculate the turning angle of the center of gravity based on the rear wheels, depending on whether the rear wheels are in-phase or out-of-phase, and revise the turning angle of the normal wheel of the front wheels on the basis of the calculated turning angle of the center of gravity.

The processor may decide whether the rear wheels are in-phase or out-of-phase, by using a predetermined turning direction of the rear wheels and a fixed turning direction of the rear wheels.

When both of the front wheels are abnormal wheels and any one of the rear wheels is an abnormal wheel, the processor may calculate the turning angle of the front wheels, and then revise the turning angle of the normal wheel of the rear wheels.

The processor may calculate the turning angle of a front left wheel of the front wheels on the basis of a turning radius of the front left wheel, calculate the turning angle of a front right wheel of the front wheels on the basis of a turning radius of the front right wheel, and calculate the turning angle of the front wheels by averaging the turning angle of the front left wheel and the turning angle of the front right wheel.

The processor may decide whether the front wheels are in-phase or out-of-phase, calculate the turning angle of the center of gravity based on the front wheels, depending on whether the front wheels are in-phase or out-of-phase, and revise the turning angle of the normal wheel of the rear wheels on the basis of the calculated turning angle of the center of gravity. The processor may decide whether the rear wheels are in-phase or out-of-phase, by using a predetermined turning direction of the front wheels and a fixed turning direction of the front wheels.

When all of the wheels are analyzed as abnormal wheels such that steering is impossible, the wheel controller may distribute different braking forces to the respective wheels, in order to steer the vehicle.

In an embodiment, an independent steering control method may include: analyzing, by a processor, whether wheels are abnormal, on the basis of turning angles of the respective wheels, and revising the turning angles of normal wheels except an abnormal wheel in which a fault occurred, according to the analysis result; and controlling, by a wheel controller, steering of the wheels according to the turning angles of the wheels, inputted from the processor.

In the revising of the turning angles of the normal wheels except the abnormal wheel in which the fault occurred, the processor may revise the turning angle of a normal wheel of the front wheels, when any one of the front wheels is an abnormal wheel.

In the revising of the turning angles of the normal wheels except the abnormal wheel in which the fault occurred, the processor may acquire an additional turning angle by subtracting the turning angle of the abnormal wheel of the front wheels from the turning angle of the normal wheel of the front wheels, calculate a final central angle by adding the additional turning angle to the turning angle of the normal wheel of the front wheels, calculate a turning radius of the vehicle on the basis of the final central angle, and then revise the turning angle of the normal wheel of the front wheels by using the turning radius of the vehicle.

In the revising of the turning angles of the normal wheels except the abnormal wheel in which the fault occurred, when any one of the rear wheels is an abnormal wheel, the processor may revise the turning angle of the normal wheel of the rear wheels.

In the revising of the turning angles of the normal wheels except the abnormal wheel in which the fault occurred, the processor may acquire an additional turning angle by subtracting the turning angle of the abnormal wheel of the rear wheels from the turning angle of the normal wheel of the rear wheels, calculate a final central angle by adding the additional turning angle to the turning angle of the normal wheel of the rear wheels, calculate a turning radius of the vehicle on the basis of the final central angle, and then revise the turning angle of the normal wheel of the front wheels by using the turning radius of the vehicle.

In the revising of the turning angles of the normal wheels except the abnormal wheel in which the fault occurred, when both of the rear wheels are abnormal wheels and any one of the front wheels is an abnormal wheel, the processor may calculates the turning angles of the abnormal rear wheels, and revise the turning angle of the normal wheel of the front wheels.

In the revising of the turning angles of the normal wheels except the abnormal wheel in which the fault occurred, the processor may calculate the turning angle of a rear left wheel of the rear wheels on the basis of a turning radius of the rear left wheel, calculate the turning angle of a rear right wheel of the rear wheels on the basis of a turning radius of the rear right wheel, and calculate the turning angle of the rear wheels by averaging the turning angle of the rear left wheel and the turning angle of the rear right wheel.

In the revising of the turning angles of the normal wheels except the abnormal wheel in which the fault occurred, the processor may decide whether the rear wheels are in-phase or out-of-phase, calculate the turning angle of the center of gravity based on the rear wheels, depending on whether the rear wheels are in-phase or out-of-phase, and revise the turning angle of the normal wheel of the front wheels on the basis of the calculated turning angle of the center of gravity.

In the revising of the turning angles of the normal wheels except the abnormal wheel in which the fault occurred, the processor may decide whether the rear wheels are in-phase or out-of-phase, by using a predetermined turning direction of the rear wheels and a fixed turning direction of the rear wheels.

In the revising of the turning angles of the normal wheels except the abnormal wheel in which the fault occurred, when both of the front wheels are abnormal wheels and any one of the rear wheels is an abnormal wheel, the processor may calculate the turning angle of the front wheels, and then revise the turning angle of the normal wheel of the rear wheels.

In the revising of the turning angles of the normal wheels except the abnormal wheel in which the fault occurred, the processor may calculate the turning angle of a front left wheel of the front wheels on the basis of a turning radius of the front left wheel, calculate the turning angle of a front right wheel of the front wheels on the basis of a turning radius of the front right wheel, and calculate the turning angle of the front wheels by averaging the turning angle of the front left wheel and the turning angle of the front right wheel.

In the revising of the turning angles of the normal wheels except the abnormal wheel in which the fault occurred, the processor may decide whether the front wheels are in-phase or out-of-phase, calculates the turning angle of the center of gravity based on the front wheels, depending on whether the front wheels are in-phase or out-of-phase, and revise the turning angle of the normal wheel of the rear wheels on the basis of the calculated turning angle of the center of gravity.

In the revising of the turning angles of the normal wheels except the abnormal wheel in which the fault occurred, the processor may decide whether the rear wheels are in-phase or out-of-phase, by using a predetermined turning direction of the front wheels and a fixed turning direction of the front wheels.

When all of the wheels are analyzed as abnormal wheels such that steering is impossible, the wheel controller may distribute different braking forces to the respective wheels, in order to steer the vehicle.

In accordance with the embodiment of the present disclosure, the independent steering control apparatus and method may adjust the turning angles of normal wheels except abnormal wheels, even though the turning angles of the abnormal wheels are fixed due to faults of the abnormal wheels, such that the vehicle can maintain an existing turning direction and an existing turning radius. Thus, the vehicle can maintain a behavior change similar to that before the faults occurred.

DETAILED DESCRIPTION OF THE ILLUSTRATED EMBODIMENTS

Figure 1:
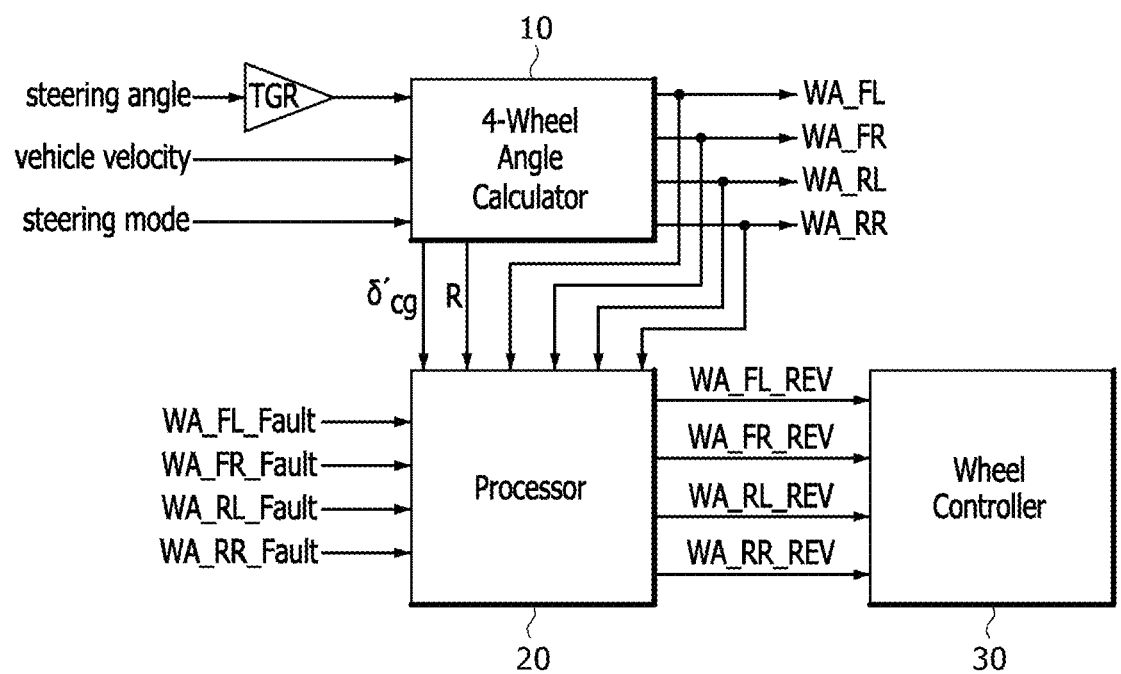
FIG. 1 is a block configuration diagram illustrating an independent steering control apparatus in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an independent steering control apparatus and method will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block configuration diagram illustrating an independent steering control apparatus in accordance with an embodiment of the present disclosure.

Referring to FIG. 1, the independent steering control apparatus in accordance with the embodiment of the present disclosure includes a 4-wheel angle calculator 10, a processor 20, and a wheel controller 30.

The 4-wheel angle calculator 10 calculates turning angles WA_FL, WA_FR, WA_RL, and WA_RR of four wheels of a vehicle, by using a command front wheel angle FWA and a vehicle velocity according to a steering mode.

WA_FL represents the turning angle of a front left wheel FL, WA_FR represents the turning angle of a front right wheel FR, WA_RL represents the turning angle of a rear left wheel RL, and WA PR represents the turning angle of a rear right wheel RR.

The process of calculating the respective turning angles WA_FL, WA_FR, WA_RL, and WA_RR of the four wheels FL, FR, RL, and RR of the vehicle, by using the command front wheel angle FWA and the vehicle velocity is obvious to those skilled in the art. Thus, the detailed descriptions thereof will be omitted herein.

The command front wheel angle FWA may be acquired through a method of applying a TGR (Total Gear Ratio) of a steering gear ratio change device to a steering angle formed by a driver turning a steering wheel or a steering angle command inputted from the ADAS (Advanced Driver Assistance Systems).

The vehicle velocity may be sensed by a vehicle velocity sensor of the vehicle.

The command front wheel angle FWA and the vehicle velocity are not limited to the above-described embodiment, and may be acquired through various calculation methods and sensors.

The command front wheel angle FWA and the vehicle velocity may function as basic parameters required for calculating the respective turning angles WA_FL, WA_FR, WA_RL, and WA_RR of the four wheels FL, FR, RL, and RR.

The steering mode is an operation mode for independently controlling the steering of the four wheels FL, FR, RL, and RR mounted in the vehicle. The steering mode may be set to any one of a normal mode, a pivot turn mode, a parallel mode, and a diagonal mode. The steering mode may be decided through a driver's operation on a switch installed in the vehicle, or decided by a CAN signal inputted from an external system.

That is, the 4-wheel angle calculator 10 receives the command front wheel angle FWA and the vehicle velocity, and calculates the respective turning angles WA_FL, WA_FR, WA_RL, and WA_RR of the four wheels FL, FR, RL, and RR by using the command front wheel angle FWA and the vehicle velocity, according to any one of the normal mode, the pivot turn mode, the parallel mode, and the diagonal mode.

In this case, the 4-wheel angle calculator 10 uses a bicycle model defined for the vehicle to calculate a turning radius which is the distance between the gravity center of the bicycle model and the center of rotation of the vehicle when the vehicle makes a turn, while the front wheel angle of the bicycle model is simulated as the command front wheel angle FWA.

Then, the 4-wheel angle calculator 10 calculates the turning angle at the gravity center of the bicycle model on the basis of the ratio of the turning angles of the front wheels FL and FR and the rear wheels RL and RR of the vehicle, calculated from state parameters of the vehicle, and then calculates the respective turning angles WA_FL, WA_FR, WA_RL, and WA_RR of the four wheels FL, FR, RL, and RR on the basis of the calculated turning radius and the calculated turning angle.

The calculated turning angles WA_FL, WA_FR, WA_RL, and WA_RR may be inputted to the wheel controller 30.

The wheel controller 30 independently controls the steering of the four wheels FL, FR, RL, and RR according to the turning angles WA_FL, WA_FR, WA_RL, and WA_RR of the four wheels, inputted from the processor 20 which will be described below. Furthermore, the wheel controller 30 controls the respective driving forces of the four wheels FL, FR, RL, and RR by controlling brake modules of the respective four wheels FL, FR, RL, and RR.

Although the turning angle of at least one of the four wheels FL, FR, RL, and RR is fixed (WA_FL_Fault, WA_FR_Fault, WA_RL_Fault, or WA_RR Fault) due to a fault of the corresponding wheel, the processor 20 revises the turning angles of the normal wheels other than the abnormal wheel, and outputs the revised turning angles WA_FL_RVE, WA_FR_RVE, WA_RL_RVE, or WA_RR_RVE.

More specifically, the processor 20 receives the respective turning angles WA_FL, WA_FR, WA_RL, and WA_RR of the four wheels FL, FR, RL, and RR from the 4-wheel angle calculator 10.

The processor 20 determines whether the four wheels FL, FR, RL, and RR are abnormal, on the basis of whether the respective turning angles WA_FL, WA_FR, WA_RL, and WA_RR of the four wheels FL, FR, RL, and RR, received from the 4-wheel angle calculator 10, are fixed.

When the determination result indicates that a fault occurred in at least one of the four wheels FL, FR, RL, and RR, the processor 20 revises the turning angles of one or more normal wheels except the abnormal wheel.

Hereafter, an independent steering control method in accordance with an embodiment of the present disclosure will be described in detail with reference to FIGS. 2 to 16.

Figure 2:
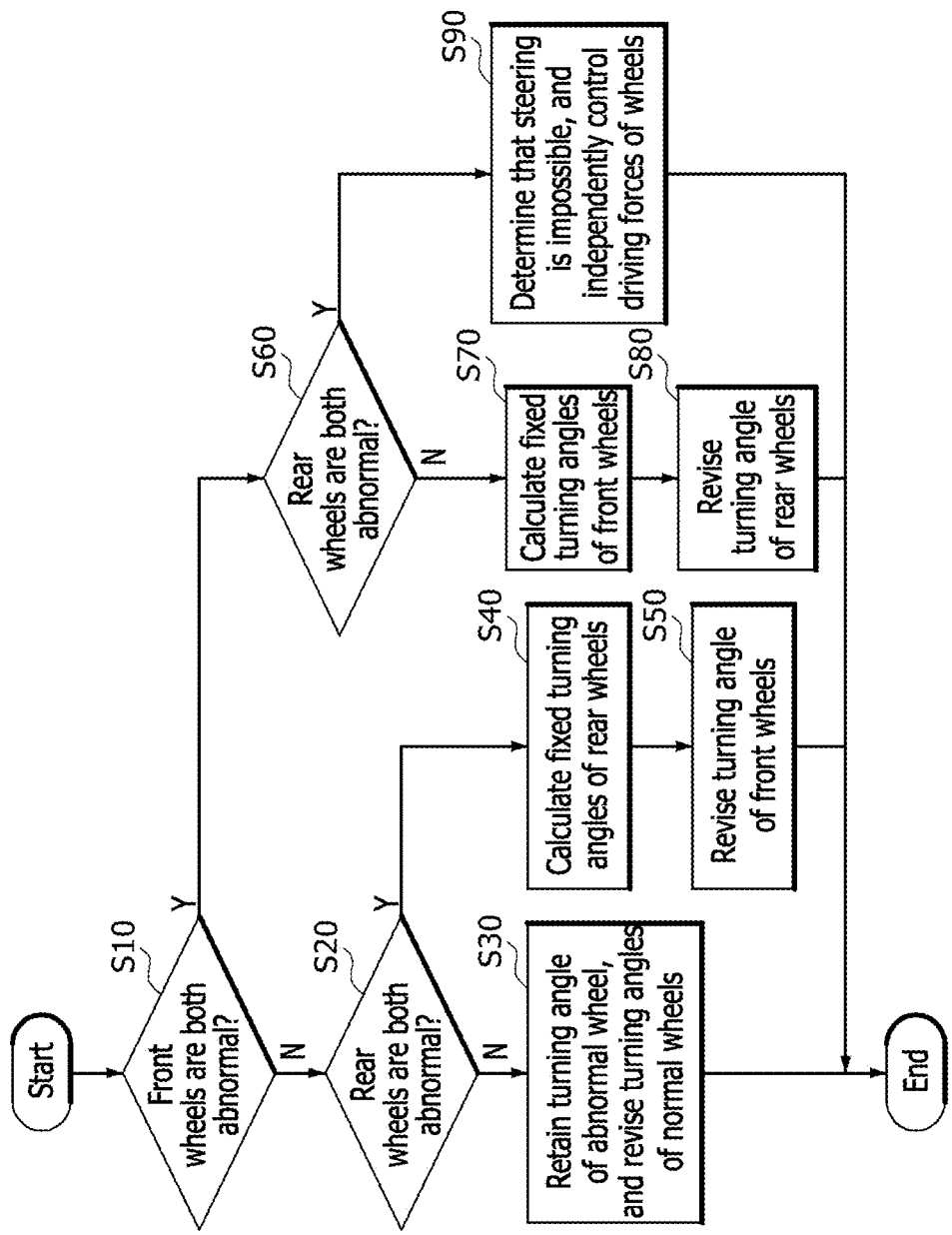
FIG. 2 is a flowchart illustrating an independent steering control method in accordance with an embodiment of the present disclosure.
Figure 3:
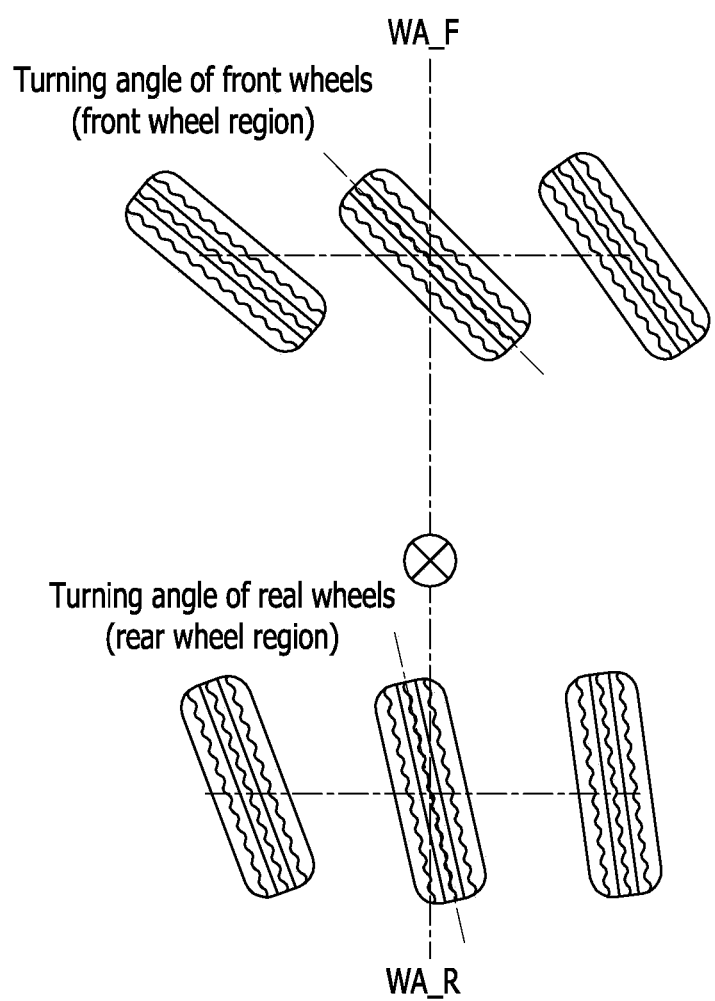
FIG. 3 is a diagram illustrating a front wheel angle and a rear wheel angle in accordance with the embodiment of the present disclosure.

FIG. 2 is a flowchart illustrating the independent steering control method in accordance with the embodiment of the present disclosure, and FIG. 3 is a diagram illustrating a front wheel angle and a rear wheel angle in accordance with the embodiment of the present disclosure.

Referring to FIGS. 2 and 3, the 4-wheel angle calculator 10 receives the command front wheel angle FWA and a vehicle velocity, and calculates the respective turning angles WA_FL, WA_FR, WA_RL, and WA_RR of the four wheels FL, FR, RL, and RR by using the command front wheel angle FWA and the vehicle velocity, according to any one of the normal mode, the pivot turn mode, the parallel mode, and the diagonal mode.

At this time, the processor 20 receives the respective turning angles WA_FL, WA_FR, WA_RL, and WA_RR of the four wheels FL, FR, RL, and RR, a turning radius R, and a turning angle δcg at the gravity center of the vehicle from the 4-wheel angle calculator 10.

The turning radius R indicates the distance between the gravity center of the bicycle model and the center of rotation when the vehicle makes a turn, while the front wheel angle of the bicycle model is simulated as the command front wheel angle FWA.

The processor 20 determines whether the respective four wheels FL, FR, RL, and RR are abnormal, on the basis of whether the respective turning angles WA_FL, WA_FR, WA_RL, and WA_RR of the four wheels FL, FR, RL, and RR are fixed.

First, the processor 20 determines whether the front wheels FL and FR are both abnormal, in step S10.

When the determination result of step S10 indicates that neither of the front wheels FL and FR are abnormal, the processor 20 determines whether the rear wheels RL and RR are both abnormal, in step S20.

The case in which neither of the front wheels FL and FR are abnormal may include the case in which any one of the front wheels FL and FR is normal or both of the front wheels FL and FR are normal.

The case in which neither of the rear wheels RL and RR are abnormal may include the case in which any one of the rear wheels RL and RR is normal or both of the rear wheels RL and RR are normal.

On the other hand, when the determination result of step S20 indicates that neither of the rear wheels RL and RR are abnormal, the processor 20 maintains the turning angles of the front wheels FL and FR and the rear wheels RL and RR.

The case in which neither of the front wheels FL and FR and the rear wheels RL and RR are abnormal is the case in which one or less of the front wheels FL and FR is abnormal or one or less of the rear wheels RL and RR is abnormal.

When one or less of the front wheels FL and FR is abnormal or one or less of the rear wheels RL and RR is abnormal, the processor 20 maintains the turning angle of the corresponding abnormal wheel. That is, since one or less of the front wheels FL and FR is an abnormal wheel or one or less of the rear wheels RL and RR is an abnormal wheel, the processor 20 maintains the rear wheel angle and the command front wheel angle FWA based on the bicycle model, which have been used by the 4-wheel angle calculator 10.

The processor 20 checks an abnormal wheel of the four wheels FL, FR, RL, and RR, and revises the turning angles of the normal wheels other than the abnormal wheel, in step S30.

Figure 4:
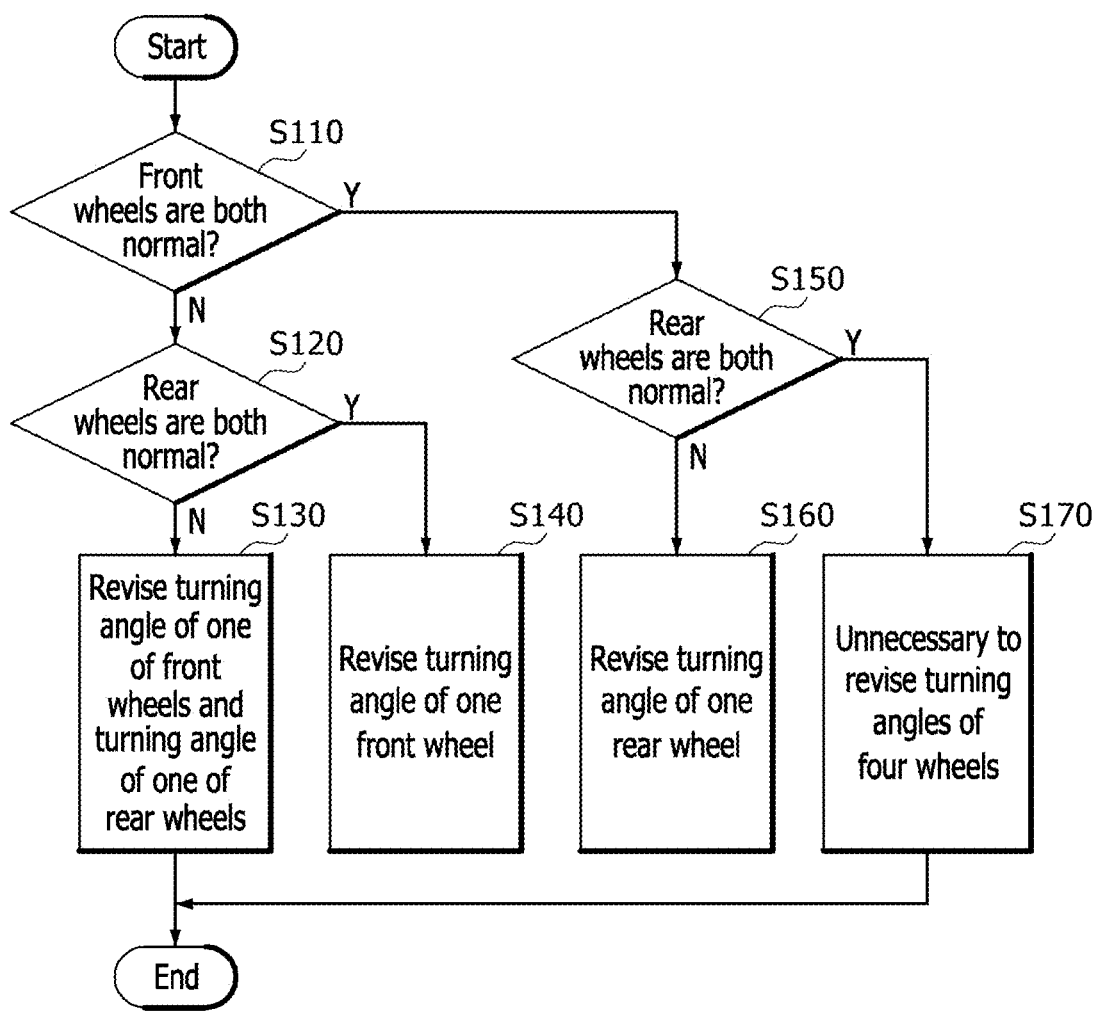
FIG. 4 is a flowchart illustrating a process of revising the turning angle of a normal wheel in FIG. 2.

FIG. 4 is a flowchart illustrating the process of revising the turning angle of a normal wheel in FIG. 2.

Referring to FIG. 4, the processor 20 checks whether the front wheels FL and FR and the rear wheels RL and RR are normal, in order to check an abnormal wheel of the four wheels FL, FR, RL, and RR, in steps S110, S120, and S150.

The case in which neither of the front wheels FL and FR and the rear wheels RL and RR are normal is the case in which any one of the front wheels FL and FR is abnormal and any one of the rear wheels RL and RR is abnormal.

In this case, the processor 20 revises the turning angle of the normal wheel of the front wheels FL and FR (any one of the front wheels FL and FR), and revises the turning angle of the normal wheel of the rear wheels RL and RR (any one of the rear wheels RL and RR), in step S130.

When the check result indicates that neither of the front wheels RL and FR are normal and the rear wheels RL and RR are both normal, it indicates that any one of the front wheels FL and FR is an abnormal wheel, and both of the rear wheels RL and RR are normal wheels. In this case, the processor 20 revises the turning angle of the normal wheel of the front wheels FL and FR, i.e. any one of the front wheels FL and FR, in step S140.

When the check result indicates that the front wheels RL and FR are both normal and neither of the rear wheels RL and RR are normal, it indicates that both of the front wheels FL and FR are normal wheels, and any one of the rear wheels RL and RR is an abnormal wheel. In this case, the processor 20 revises the turning angle of the normal wheel of the rear wheels RL and RR, i.e. any one of the rear wheels RL and RR, in step S150.

When the check result indicates that the front wheels FL and FR are both normal and the rear wheels RL and RR are both normal, the processor 20 determines that the turning angles of the four wheels FL, FR, RL, and RR do not need to be revised, in step S170.

When any one of the front wheels is an abnormal wheel, it indicates that any one of the front left wheel FL and the front right wheel FR is an abnormal wheel. Therefore, when the front left wheel FL is an abnormal wheel, the processor 20 revises the turning angle of the front right wheel FR which is a normal wheel. Furthermore, when the front right wheel FR is an abnormal wheel, the processor 20 revises the turning angle of the front left wheel FL which is a normal wheel.

When any one of the rear wheels RL and RR is an abnormal wheel, it indicates that any one of the rear left wheel RL and the rear right wheel RR is an abnormal wheel. When the rear left wheel RL is an abnormal wheel, the processor 20 revises the turning angle of the rear right wheel RR which is a normal wheel. Furthermore, when the rear right wheel RR is an abnormal wheel, the processor 20 revises the turning angle of the rear left wheel RL which is a normal wheel.

As such, the process of revising the turning angles of normal wheels when any one of the front wheels FL and FR and any one of the rear wheels RL and RR are abnormal wheels will be described with reference to FIGS. 5 to 9.

Figure 5:
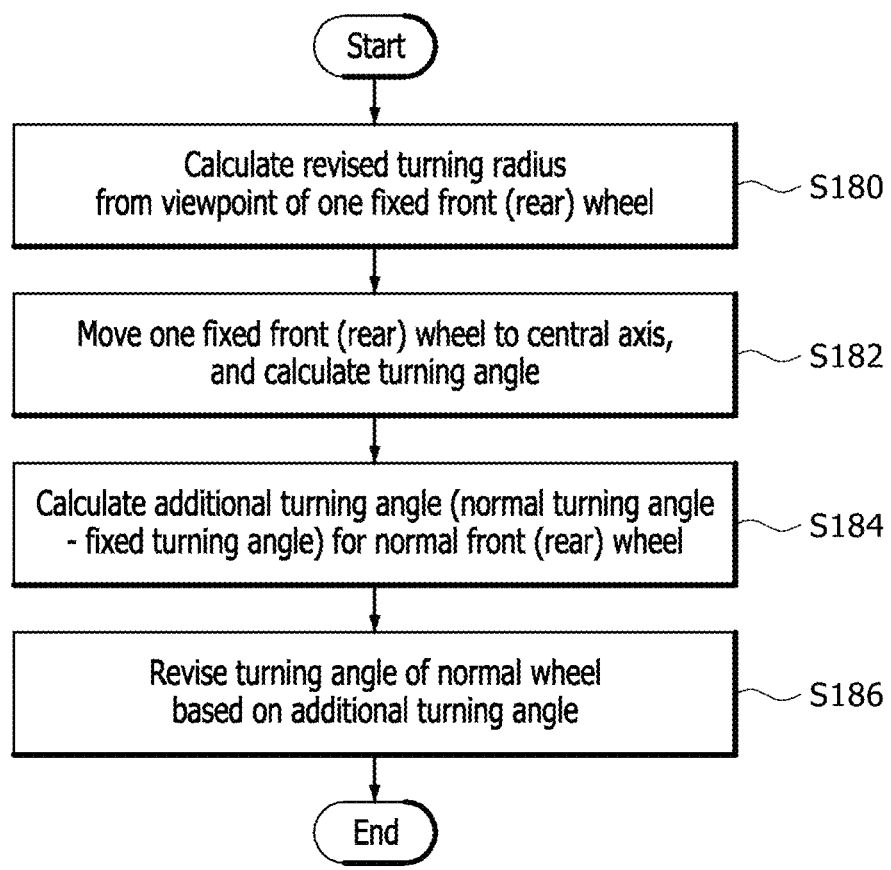
FIG. 5 is a flowchart illustrating the process of revising the turning angle of a normal wheel in FIG. 4.

FIG. 5 is a flowchart illustrating a process of revising the turning angle of a normal wheel (any one of the front wheels FL and FR or any one of the rear wheels RL and RR) in FIG. 4.

Referring to FIG. 5, the processor 20 calculates a turning radius Rrev from the viewpoint of an abnormal wheel (any one of the front wheels FL and FR or any one of the rear wheels RL and RR), in step S180.

Then, the processor 20 moves the abnormal wheel (any one of the front wheels FL and FR or any one of the rear wheels RL and RR) to the central axis of the bicycle model, and calculates a turning angle WA_Frev at the central axis of the bicycle model, in step S182.

Then, the processor 20 calculates an additional turning angle for a normal wheel (any one of the front wheels FL and FR or any one of the rear wheels RL and RR). At this time, the processor 20 may calculate the additional turning angle by subtracting a fixed turning angle of the abnormal wheel from a normal turning angle, in step S184.

The processor 20 revises the turning angle of the normal wheel on the basis of the additional turning angle in step S186. That is, the processor 20 calculates a final central angle WA_Ffinal by adding the additional turning angle to the turning angle of the normal wheel.

Then, the processor 20 calculates a revised turning radius Rfinal on the basis of the revised final central angle WA_Ffinal, and revises the turning angle of the normal wheel (any one of WA_FRrev and WA_FLrev or any one of WA_RRrev and WA_RLrev) by using the revised turning radius Rfinal.

The process of calculating the revised turning angle (any one of WA_FRrev and WA_FLrev or any one of WA_RRrev and WA_RLrev) of the normal wheel will be described in detail.

First, a process of revising the turning angle of the front right wheel FR which is a normal wheel, due to a fault of the front left wheel FL, will be described with reference to FIG. 6.

Figure 6:
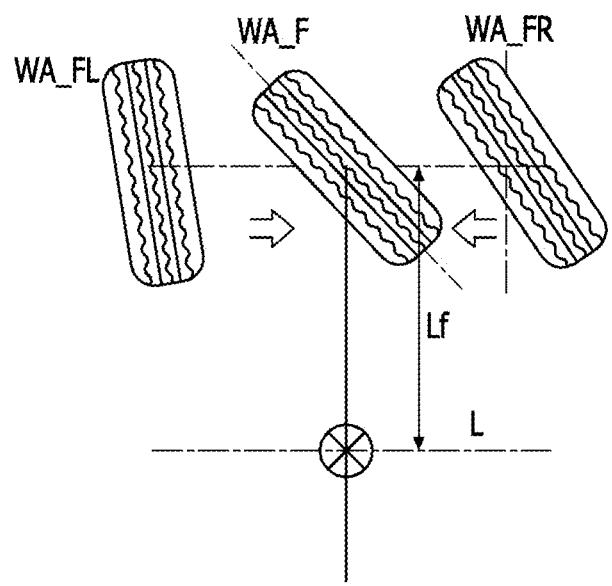
FIG. 6 is a diagram illustrating a process of revising the turning angle of a front right wheel which is a normal wheel, due to a fault of a front left wheel in FIG. 5.

FIG. 6 is a diagram illustrating a process of revising the turning angle of the front right wheel FR which is a normal wheel, due to a fault of the front left wheel FL in FIG. 5.

Referring to FIG. 6, when the turning angle WA_FL of the front left wheel FL is fixed to xdeg due to a fault of the front left wheel FL, x is expressed by Equation 1 below.

$$x = \tan^{-1}\left(\frac{Lf}{R_{rev} - W/2}\right) \quad \text{[Equation 1]}$$

Here, Lf represents the distance from the gravity center of the vehicle to a front wheel axle, Rrev represents a revised turning radius, and W represents the width of the vehicle.

In this case, the processor 20 may acquire the revised turning radius Rrev by using Equation 2 below.

$$R_{rev} = \frac{Lf}{\tan(x)} + \frac{W}{2} \quad \text{[Equation 2]}$$

Then, the processor 20 moves the front left wheel FL to the central axis of the bicycle model and calculates the turning angle WA_Frev at the central axis of the bicycle model, as expressed by Equation 3 below.

$$WA\_F_{rev} = \tan^{-1}\left(\frac{Lf}{R_{rev}}\right) \quad \text{[Equation 3]}$$

Then, the processor 20 calculates an additional turning angle for the front left wheel FL. The processor 20 calculates the additional turning angle by subtracting the turning angle of the front left wheel FL from the turning angle WA_F of the front right wheel FR in Equation 4 below, and revises the turning angle of the front right wheel FR on the basis of the additional turning angle.

In this case, the processor 20 calculates a revised final central angle WA_Ffinal by adding the additional turning angle to the turning angle of the front right wheel FR as expressed by Equation 5 below.

$$WA\_F_{rev} = \tan^{-1}\left(\frac{Lf}{R}\right) \quad \text{[Equation 4]}$$

$$WA\_F_{final} = \tan^{-1}\left(\frac{Lf}{R}\right) + \{\tan^{-1}\left(\frac{Lf}{R}\right) - \tan^{-1}\left(\frac{Lf}{R_{rev}}\right)\} \quad \text{[Equation 5]}$$

Then, the processor 20 calculates the turning radius $R_{final}$ as expressed by Equation 6 below, on the basis of the revised final central angle WA_F$_{final}$.

$$R_{final} = \frac{Lf}{\tan(WA\_F_{final})} \quad \text{[Equation 6]}$$

Then, the processor 20 calculates a revised turning angle WA_FR$_{rev}$ as expressed by Equation 7 below, by using the revised turning radius R$_{final}$, and outputs the revised turning angle WA_FR$_{rev}$ of the front right wheel FR.

$$WA\_FR_{rev} = \tan^{-1}\left(\frac{Lf}{R_{final} + W/2}\right) \quad \text{[Equation 7]}$$

That is, when the front wheels are normal, the turning angle WA_FL of the front left wheel FL needs to be equal to the front-wheel turning angle WA_F even though the front left wheel FL is moved to the central axis, and the turning angle WA_FR of the front right wheel FR needs to be equal to the front-wheel turning angle WA_F even though the front right wheel FR is moved to the central axis.

However, since the turning angle of an abnormal wheel is fixed to a specific turning angle, the turning angle of the abnormal wheel does not become a desired front-wheel turning angle WA_F. Thus, the independent steering control apparatus compensates for a lack in the normal turning angle, such that the normal wheel is turned more or turned less.

Next, a process of revising the turning angle of the front left wheel FL which is a normal wheel, due to a fault of the front right wheel FR, will be described with reference to FIG. 7.

Figure 7:
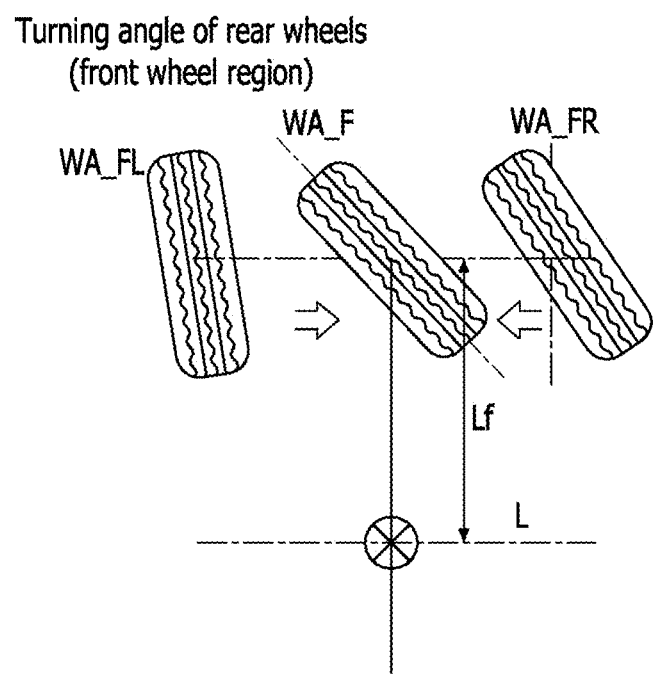
FIG. 7 is a diagram illustrating a process of revising the turning angle of the front left wheel which is a normal wheel, due to a fault of the front right wheel in FIG. 5.

FIG. 7 is a diagram illustrating a process of revising the turning angle of the front left wheel which is a normal wheel, due to a fault of the front right wheel in FIG. 5.

Referring to FIG. 7, when the turning angle WA_FR of the front right wheel FR is fixed to xdeg due to the fault of the front right wheel FR, x is expressed as Equation 8 below.

$$x = \tan^{-1}\left(\frac{Lf}{R_{rev} + W/2}\right) \quad \text{[Equation 8]}$$

Here, Lf represents the distance from the gravity center of the vehicle to the front wheel axle, $R_{rev}$ represents a revised turning radius, and W represents the width of the vehicle.

In this case, the processor 20 may acquire the revised turning radius $R_{rev}$ by using Equation 9 below.

$$R_{rev} = \frac{Lf}{\tan(x)} - \frac{W}{2} \quad \text{[Equation 9]}$$

Then, the processor 20 moves the fixed front right wheel FR to the central axis of the bicycle model, and calculates the turning angle WA_Frev at the center axis of the bicycle model as expressed by Equation 10 below.

$$WA\_F_{rev} = \tan^{-1}\left(\frac{Lf}{R_{rev}}\right) \quad \text{[Equation 10]}$$

Then, the processor 20 calculates an additional turning angle for the front left wheel FL. The processor 20 calculates the additional turning angle by subtracting the turning angle of the front right wheel FR from the turning angle of the front left wheel FL in Equation 11 below, and revises the turning angle of the front left wheel FL on the basis of the additional turning angle.

In this case, the processor 20 calculates a revised final central angle WA_F$_{final}$ by adding the additional turning angle to the turning angle of the front right wheel FR as expressed by Equation 12 below.

$$WA\_F = \tan^{-1}\left(\frac{Lf}{R}\right) \quad \text{[Equation 11]}$$

$$WA\_F_{final} = \tan^{-1}\left(\frac{Lf}{R}\right) + \{\tan^{-1}\left(\frac{Lf}{R}\right) - \tan^{-1}\left(\frac{Lf}{R_{rev}}\right)\} \quad \text{[Equation 12]}$$

Then, the processor 20 revises calculates a revised turning radius R$_{final}$ as expressed by Equation 13 below, on the basis of the revised final central angle WA_F$_{final}$.

$$R_{final} = \frac{Lf}{\tan(WA\_F_{final})} \quad \text{[Equation 13]}$$

Then, the processor 20 calculates a revised turning angle WA_L$_{rev}$ of the front left wheel FL as expressed by Equation 14 below, by using the revised turning radius R$_{final}$, and outputs the revised turning angle WA_LR$_{rev}$ of the front left wheel FL.

$$WA\_FR_{rev} = \tan^{-1}\left(\frac{Lf}{R_{final} + W/2}\right) \quad \text{[Equation 14]}$$

Next, a process of revising the turning angle of the rear left wheel RL which is a normal wheel, when the turning angle of the rear right wheel RR is fixed, will be described with reference to FIG. 8.

Figure 8:
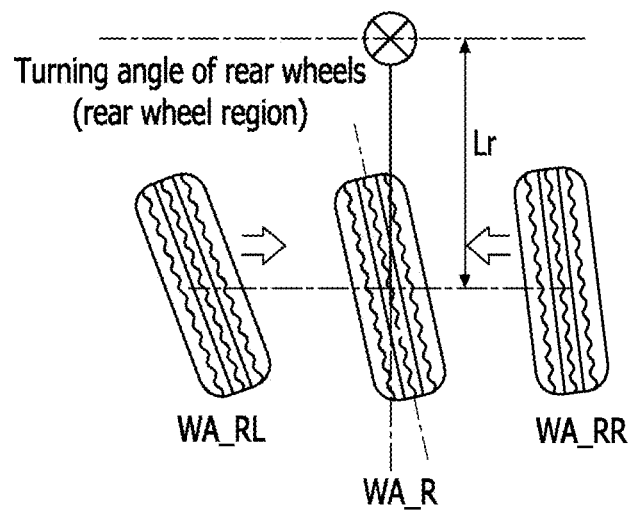
FIG. 8 is a diagram illustrating a process of revising the turning angle of a rear right wheel which is a normal wheel, due to a fault of a rear left wheel in FIG. 5.

FIG. 8 is a diagram illustrating a process of revising the turning angle of the rear right wheel which is a normal wheel, due to a fault of the rear left wheel in FIG. 5.

Referring to FIG. 8, when the turning angle WA_RL of the rear left wheel RL is fixed to xdeg due to a fault of the rear left wheel RL, x is expressed as Equation 15 below.

$$x = \tan^{-1}\left(\frac{Lr}{R_{rev} - W/2}\right) \quad \text{[Equation 15]}$$

Here, Lr represents the distance from the gravity center of the vehicle to a rear wheel axle, $R_{rev}$ represents a revised turning radius, and W represents the width of the vehicle.

In this case, the processor 20 may acquire the revised turning radius $R_{rev}$ by using Equation 16 below.

$$R_{rev} = \frac{Lr}{\tan(x)} + \frac{W}{2} \quad \text{[Equation 16]}$$

Then, the processor 20 moves the fixed rear right wheel RR to the central axis of the bicycle model, and calculates the turning angle WA_F$_{rev}$ at the center axis of the bicycle model as expressed by Equation 17 below.

$$WA\_F_{rev} = \tan^{-1}\left(\frac{Lr}{R_{rev}}\right) \quad \text{[Equation 17]}$$

Then, the processor 20 calculates an additional turning angle for the rear left wheel RL. The processor 20 calculates the additional turning angle by subtracting the turning angle of the rear left wheel RL from the turning angle WA_F of the rear right wheel RR in Equation 18, and revises the turning angle of the rear right wheel RR on the basis of the additional turning angle.

In this case, the processor 20 calculates a revised final central angle WA_Ffinal by adding the additional turning angle to the turning angle of the rear right wheel RR as expressed by Equation 19 below.

$$WA\_F = \tan^{-1}\left(\frac{Lr}{R}\right) \quad \text{[Equation 18]}$$

$$WA\_F_{final} = \tan^{-1}\left(\frac{Lr}{R}\right) + \left\{\tan^{-1}\left(\frac{Lr}{R}\right) - \tan^{-1}\left(\frac{Lr}{R_{rev}}\right)\right\} \quad \text{[Equation 19]}$$

Then, the processor 20 calculates a revised turning radius $R_{final}$ as expressed by Equation 20 below, on the basis of the revised final central angle $WA\_F_{final}$.

$$R_{final} = \frac{Lr}{\tan(WA\_F_{final})} \quad \text{[Equation 20]}$$

Then, the processor 20 calculates a revised turning angle $WA\_RR_{rev}$ of the rear right wheel RR as expressed by Equation 21, by using the revised turning radius $R_{final}$, and outputs the revised turning angle $WA\_RR_{rev}$ of the rear right wheel RR.

$$WA\_RR_{rev} = \tan^{-1}\left(\frac{Lr}{R_{final} + W/2}\right) \quad \text{[Equation 21]}$$

Next, the process of revising the turning angle of the rear left wheel RL which is a normal wheel, when the turning angle of the rear right wheel RR is fixed, will be described with reference to FIG. 9.

Figure 9:
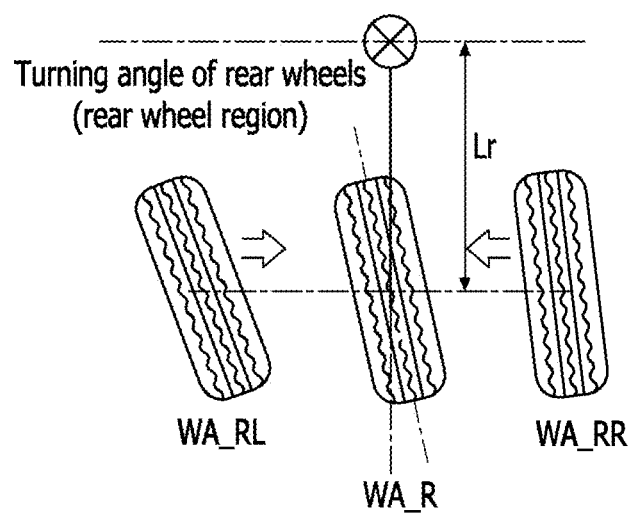
FIG. 9 is a diagram illustrating a process of revising the turning angle of the rear left wheel which is a normal wheel, due to a fault of the rear right wheel in FIG. 5.

FIG. 9 is a diagram illustrating the process of revising the turning angle of the rear left wheel which is a normal wheel, due to a fault of the rear right wheel in FIG. 5.

Referring to FIG. 9, when the turning angle WA_RR of the rear right wheel RR is fixed to xdeg due to a fault of the rear right wheel RR, x is expressed as Equation 22 below.

$$x = \tan^{-1}\left(\frac{Lr}{R_{rev} + W/2}\right) \quad \text{[Equation 22]}$$

Here, Lr represents the distance from the gravity center of the vehicle to the rear wheel axle, Rrev represents a revised turning radius, and W represents the width of the vehicle.

In this case, the processor 20 may acquire the revised turning radius Rrev by using Equation 23 below.

$$R_{rev} = \frac{Lr}{\tan(x)} - \frac{W}{2} \quad \text{[Equation 23]}$$

Then, the processor 20 moves the fixed rear right wheel RR to the center axis of the bicycle model, and calculates the turning angle WA_Frev at the central axis of the bicycle model as expressed by Equation 24 below.

$$WA\_F_{rev} = \tan^{-1}\left(\frac{Lr}{R_{rev}}\right) \quad \text{[Equation 24]}$$

Then, the processor 20 calculates an additional turning angle for the rear right wheel RR. The processor 20 calculates the additional turning angle by subtracting the turning angle of the rear right wheel RR from the turning angle WA_F of the rear left wheel RL in Equation 25, and revises the turning angle of the rear left wheel RL on the basis of the additional turning angle.

In this case, the processor 20 calculates a revised final central angle WA_Ffinal by adding the additional turning angle to the turning angle of the rear left wheel RL as expressed by Equation 26 below.

$$WA\_F = \tan^{-1}\left(\frac{Lr}{R}\right) \quad \text{[Equation 25]}$$

$$WA\_F_{final} = \tan^{-1}\left(\frac{Lr}{R}\right) + \left\{\tan^{-1}\left(\frac{Lr}{R}\right) - \tan^{-1}\left(\frac{Lr}{R_{rev}}\right)\right\} \quad \text{[Equation 26]}$$

Then, the processor 20 calculates a revised turning radius $R_{final}$ as expressed by Equation 27 below, on the basis of the revised final central angle $WA\_F_{final}$.

$$R_{final} = \frac{Lr}{\tan(WA\_F_{final})} \quad \text{[Equation 27]}$$

Then, the processor 20 calculates a revised turning angle WA_RLrev of the normal wheel as expressed by Equation 28 below, by reflecting the revised turning radius Rfinal.

$$WA\_RL_{rev} = \tan^{-1}\left(\frac{Lr}{R_{final} - W/2}\right) \quad \text{[Equation 28]}$$

When the determination result of step S20 in FIG. 2 indicates that the rear wheels RL and RR are both abnormal, the processor 20 calculates the fixed turning angles of the rear wheels RL and RR in step S40. This case corresponds to the case in which neither of the front wheels FL and FR are abnormal, and the rear wheels RL and RR are both abnormal.

Figure 10:
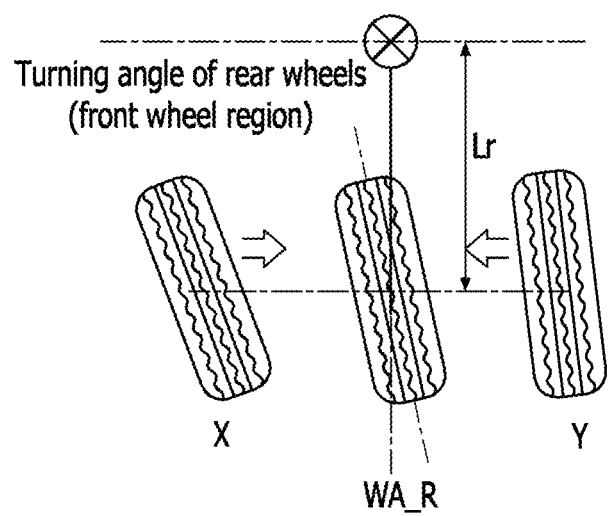
FIG. 10 is a diagram illustrating a method for calculating the fixed turning angle of a rear wheel in FIG. 2.

FIG. 10 is a diagram illustrating a method for calculating a fixed turning angle of a rear wheel in FIG. 2.

Referring to FIG. 10, the fixed turning angle of the rear left wheel RL is defined as x, as expressed by Equation 29 below.

$$x = \tan^{-1}\left(\frac{Lr}{R_{rev\_RL} + W/2}\right) \quad \text{[Equation 29]}$$

Here, Rrev_RL represents a revised turning radius of the rear left wheel RL. The processor 20 may acquire the revised turning radius Rrev_RL through Equation 30 below.

$$R_{rev\_RL} = \frac{Lr}{\tan(x)} + \frac{W}{2} \quad \text{[Equation 30]}$$

The fixed turning angle of the rear right wheel RR is defined as y, as expressed by Equation 31 below.

$$y = \tan^{-1}\left(\frac{Lr}{R_{rev\_RR} + W/2}\right) \quad \text{[Equation 31]}$$

Here, $R_{rev}\_RR$ represents the revised turning radius of the rear right wheel RR. The processor 20 calculates the revised turning radius $R_{rev}\_RR$ by using Equation 32 below.

$$R_{rev\_RR} = \frac{Lr}{\tan(y)} - \frac{W}{2} \quad \text{[Equation 32]}$$

The processor 20 moves both of the rear left wheel RL and the rear right wheel RR to the center axis as expressed by Equations 33 and 34 below.

$$WA\_R_{rev\_RL} = \tan^{-1}\left(\frac{Lr}{R_{rev\_RL}}\right) \quad \text{[Equation 33]}$$

$$WA\_R_{rev\_RR} = \tan^{-1}\left(\frac{Lr}{R_{rev\_RR}}\right) \quad \text{[Equation 34]}$$

Then, the processor 20 calculates a fixed turning angle $WA\_R_{Fix}$ of the rear wheels RR and RL by averaging the turning angles of the rear left wheel RL and the rear right wheel RR which have been moved to the central axis, as expressed by Equation 35 below.

$$WA\_R_{Fix} = (WA\_R_{rev\_RL} + WA\_R_{rev\_RR})/2 \quad \text{[Equation 35]}$$

As the fixed turning angle $WA\_R_{Fix}$ of the rear wheels RR and RL is calculated, the processor 20 recalculates the turning angle of the front wheels which are normal wheels, in step S50.

Figure 11:
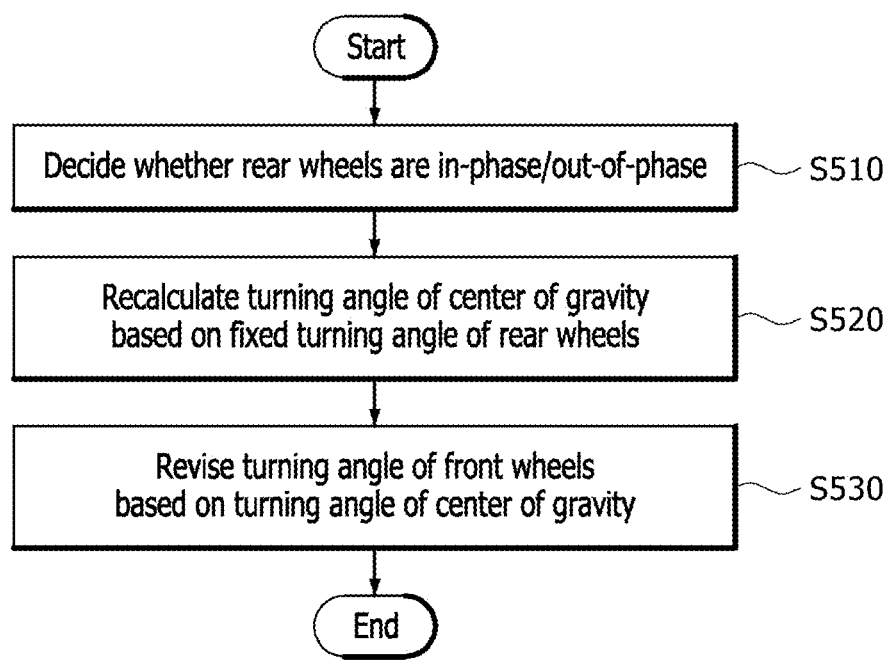
FIG. 11 is a flowchart illustrating a process of revising the turning angle of a front wheel in FIG. 2.
Figure 12:
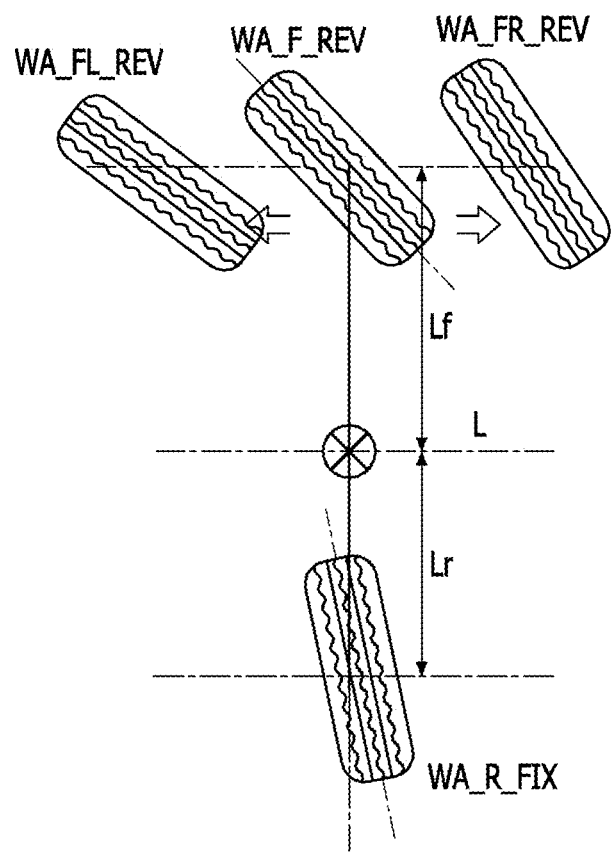
FIG. 12 is a diagram illustrating a method for revising the turning angle of the front wheel in FIG. 11.

FIG. 11 is a flowchart illustrating the process of revising the turning angle of a front wheel in FIG. 2, and FIG. 12 is a diagram illustrating a method for revising the turning angle of the front wheel in FIG. 11.

Referring to FIGS. 11 and 12, the processor 20 decides whether the rear wheels RL and RR are in-phase or out-of-phase, in step S510.

Then, the processor 20 recalculates the turning angle of the center of gravity on the basis of the fixed turning angle of the rear wheels RL and RR.

Finally, the processor 20 recalculates the turning angle of the front wheels on the basis of the recalculated turning angle of the center of gravity.

In this case, when any one of the front wheels FL and FR is an abnormal wheel or when both of the rear wheels RL and RR are abnormal wheels and any one of the front wheels FL and FR is an abnormal wheel, the processor 20 revises the turning angle of the corresponding normal wheel through the process of recalculating the turning angle of the front wheels in FIG. 4.

On the other hand, when both of the front wheels FL and FR are normal wheels, the processor 20 recalculates the turning angles of both of the front wheels FL and FR.

Here, a predetermined turning radius is defined as R, the turning direction is defined as sign(o'cg), CW (Clock Wise) is defined as +1, CCW (Counter Clock Wise) is defined as −1, in-phase is defined as 1, and out-of-phase is defined as −1.

The fixed rear-wheel turning angle is defined as WA_R, and the recalculated front-wheel turning angle is defined as WA_F_REV. The turning angles of the front wheels, recalculated on the basis of the four wheels, are defined as WA_FL_REV and WA_FR_REV, respectively.

More specifically, the processor 20 decides whether the rear wheels RR and RL of the vehicle are in-phase or out-of-phase on the basis of the turning direction of the rear wheels RL and RR.

In this case, the processor 20 decides that the rear wheels RR and RL are in-phase, when a value obtained by multiplying a fixed turning direction of the rear wheels by a predetermined turning direction of the rear wheels is 1, and decides that the rear wheels RR and RL are out-of-phase, when the value obtained by multiplying the fixed turning direction of the rear wheels by the predetermined turning direction of the rear wheels is −1.

For example, the processor 20 decides that the rear wheels RR and RL are out-of-phase (−1), when the predetermined turning angle CW of the rear wheels is 1 and the fixed turning direction CCW of the rear wheels is −1, and decides that the rear wheels RR and RL are in-phase (1), when the predetermined turning angle CW of the rear wheels is −1 and the fixed turning direction CCW of the rear wheels is −1.

Then, the processor 20 recalculates the turning angle of the center of gravity in consideration of the in-phase and the out-of-phase at the fixed turning angle of the rear wheels RL and RR. The recalculated turning angle of the center of gravity is referred to as δ'cg_rev.

When the rear wheels RR and RL are in-phase, the processor 20 calculates the fixed turning angle WA_R of the rear wheels through Equation 36 below.

$$WA\_R = \tan^{-1}\left(\frac{c\_rev - Lr}{R_{r\_rev}}\right) \times \text{sign}\left(\delta'_{cg}\right) \quad \text{[Equation 36]}$$

Here, when the turning angle WA_R of the rear wheels RR and RL is equal to or less than a preset value which is not relatively large, the turning angle WA_R of the rear wheels is calculated as expressed by Equation 37 below.

$$WA\_R = \left(\frac{c\_rev - Lr}{R_{r\_rev}}\right) \times \text{sign}\left(\delta'_{cg}\right) \quad \text{[Equation 37]}$$

Here, $R_{r\_rev}$ is equal to R×cos δ'$_{cg\_rev}$, and c_rev is equal to R×sin δ'$_{cg\_rev}$.

Therefore, the turning angle WA_R of the rear wheels RR and RL is calculated as expressed by Equation 38 below.

$$WA\_R = \left(\frac{R \times \sin\delta'_{cg\_rev} - Lr}{R \times \cos\delta'_{cg\_rev}}\right) \times \text{sign}\left(\delta'_{cg}\right) \quad \text{[Equation 38]}$$

Therefore, when the rear wheels RR and RL are in-phase, the turning angle $\delta_{cg\_rev}$ of the center of gravity is recalculated as expressed by Equation 39 below.

$$\delta'_{cg\_rev} = \sin^{-1}\left(\frac{Lr \times \text{sign}\left(\delta'_{cg}\right)}{R\sqrt{1 + WA\_R^2}}\right) - \alpha \quad \text{[Equation 39]}$$

$$\alpha = \sin^{-1}\left(\frac{-WA\_R \times R}{R\sqrt{1 + WA\_R^2}}\right)$$

On the other hand, when the rear wheels RR and RL are out-of-phase, the turning angle WA_R of the rear wheels RR and RL is calculated as expressed by Equation 41 below.

$$WA\_R = -1 \times \tan^{-1}\left(\frac{Lr - c\_rev}{R_{r\_rev}}\right) \times \text{sign}\left(\delta'_{cg}\right) \quad \text{[Equation 40]}$$

Here, when the turning angle WA_R of the rear wheels RR and RL is equal to or less than the preset value which is not relatively large, the turning angle WA_R of the rear wheels RR and RL is calculated as expressed by Equation 41 below.

$$WA\_R = \left(\frac{c\_rev - Lr}{R_{r\_rev}}\right) \times \text{sign}\left(\delta'_{cg}\right) \quad \text{[Equation 41]}$$

Here, $R_{r\_rev}$ is equal to $R \times \cos \delta'_{cg\_rev}$, and c_rev is equal to $R \times \sin \delta'_{cg\_rev}$.

Therefore, when the rear wheels RR and RL are out-of-phase, the turning angle $\delta'_{cg\_rev}$ of the center of gravity is recalculated as expressed by Equation 43 below.

$$\Rightarrow \delta'_{cg\_rev} = \sin^{-1}\left(\frac{Lr \times \text{sign}\left(\delta'_{cg}\right)}{R\sqrt{1 + WA\_R^2}}\right) - \alpha \quad \text{[Equation 42]}$$

$$\alpha = \sin^{-1}\left(\frac{-WA\_R \times R}{R\sqrt{1 + WA\_R^2}}\right)$$

As such, the recalculated turning angle δ'cg_rev of the center of gravity when the rear wheels RR and RL are in-phase is equal to that when the rear wheels RR and RL are out-of-phase.

Then, the processor 20 calculates the turning angle WA_F_REV of the front wheels as expressed by Equation 43 below, by using the recalculated turning angle δcg_rev of the center of gravity.

$$WA\_F_{REV} = \tan^{-1}\left(\frac{Lf + c\_rev}{R_{r\_rev}}\right) \times \text{sign}\left(\delta'_{cg}\right) \quad \text{[Equation 43]}$$

Here, Rr_rev is equal to $R \times \cos \delta'$cg_rev, and c_rev is equal to $R \times \sin \delta'$cg_rev.

When the determination result of step S10 in FIG. 2 indicates that neither of the front wheels FL and FR are abnormal, the processor 20 determines whether the rear wheels RL and RR are both abnormal, in step S60.

When the determination result of step S60 indicates that neither of the rear wheels RL and RR are abnormal, the processor 20 calculates the fixed turning angle of the front wheels FL and FR in step S70. This case corresponds to the case in which the front wheels FL and FR are both abnormal, and neither of the rear wheels RL and RR are abnormal.

Figure 13:
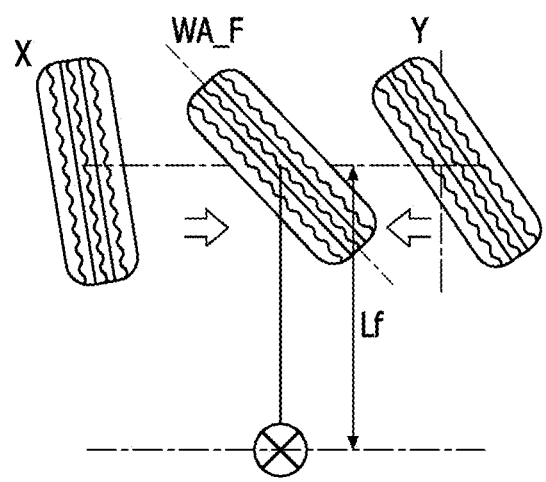
FIG. 13 is a diagram illustrating a method for calculating the fixed turning angle of the front wheel in FIG. 2.

FIG. 13 is a diagram illustrating a method for calculating the fixed turning angle of the front wheel in FIG. 2.

Referring to FIG. 13, the fixed turning angle of the front left wheel FL is defined as x, as expressed by Equation 44 below.

$$x = \tan^{-1}\left(\frac{Lf}{R_{rev\_FL} + W/2}\right) \quad \text{[Equation 44]}$$

Here, Rrev_FL represents the revised turning radius of the front left wheel RL. The processor 20 calculates the turning radius Rrev_FL of the front left wheel FL through Equation 45 below.

$$R_{rev\_FL} = \frac{Lf}{\tan(x)} + \frac{W}{2} \quad \text{[Equation 45]}$$

The fixed turning angle of the front right wheel FR is defined as y, as expressed by Equation 46 below.

$$y = \tan^{-1}\left(\frac{Lf}{R_{rev\_FR} + W/2}\right) \quad \text{[Equation 46]}$$

Here, $R_{rev}$_FR represents the revised turning radius of the front right wheel. The processor 20 calculates the revised turning radius Rrev_FR of the front right wheel by using Equation 47 below.

$$R_{rev\_PR} = \frac{Lf}{\tan(y)} - \frac{W}{2} \quad \text{[Equation 47]}$$

The processor 20 moves both of the front left wheel FL and the front right wheel FR to the central axis as expressed by Equations 48 and 49 below.

$$WA\_F_{rev\_FL} = \tan^{-1}\left(\frac{Lf}{R_{rev\_FL}}\right) \quad \text{[Equation 48]}$$

$$WA\_F_{rev\_FR} = \tan^{-1}\left(\frac{Lf}{R_{rev\_FR}}\right) \quad \text{[Equation 49]}$$

Then, the processor 20 calculates the fixed turning angle WA_F$_{Fix}$ of the front wheels by averaging the turning angles of the front left wheel FL and the front right wheel FR which have been moved to the central axis, as expressed by Equation 50.

$$WA\_F_{Fix} = (WA\_F_{rev\_FL} + WA\_F_{rev\_FR})/2 \quad \text{[Equation 50]}$$

As the fixed turning angle WA_FFIX of the front wheels is calculated, the processor 20 recalculates the turning angle of the rear wheels RL and RR which are normal wheels in step S80.

Figure 14:
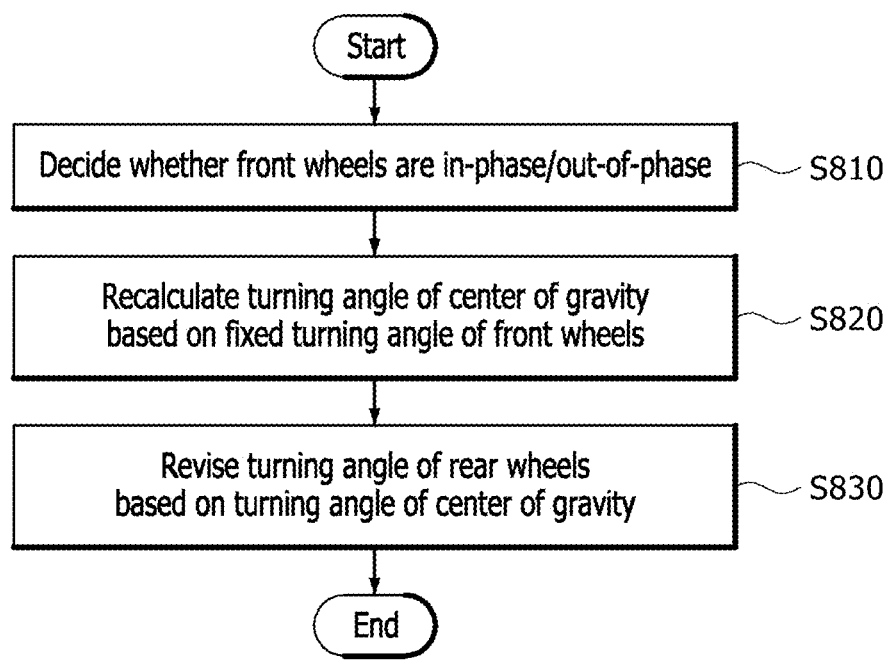
FIG. 14 is a flowchart illustrating a process of revising the turning angle of the rear wheel in FIG. 2.
Figure 15:
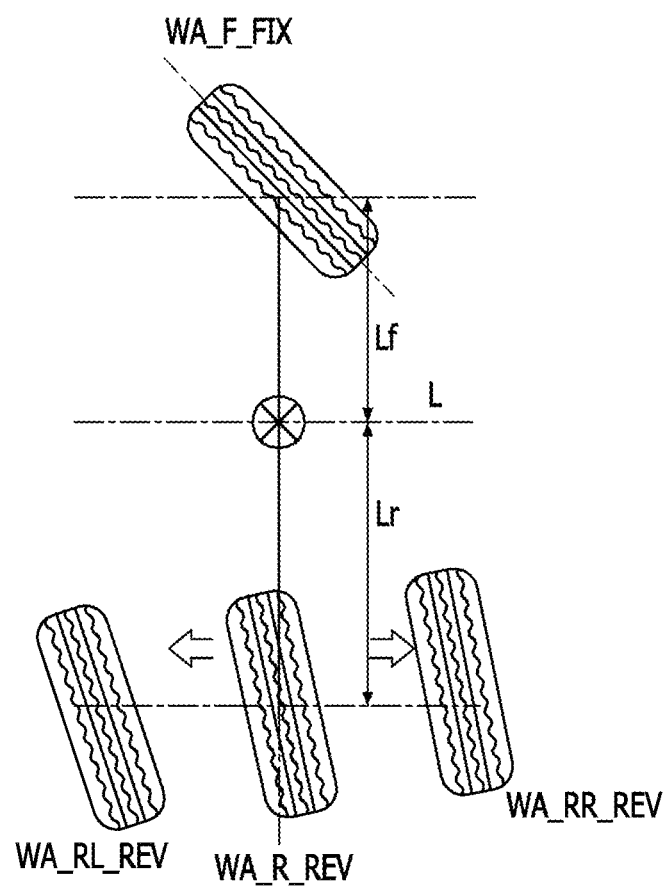
FIG. 15 is a diagram illustrating a method for revising the turning angle of the rear wheel in FIG. 14.

FIG. 14 is a flowchart illustrating the process of revising the turning angle of a rear wheel in FIG. 2, and FIG. 15 is a diagram illustrating a method for revising the turning angle of the rear wheel in FIG. 14.

Referring to FIGS. 14 and 15, the processor 20 decides whether the front wheels FL and FR are in-phase or out-of-phase, in step S810.

Then, the processor 20 recalculates the turning angle of the center of gravity on the basis of the fixed turning angle of the front wheels FL and FR.

Finally, the processor 20 recalculates the turning angle of the rear wheels on the basis of the recalculated turning angle of the center of gravity.

In this case, when any one of the rear wheels is an abnormal wheel or when both of the front wheels FL and FR are abnormal wheels and any one of the rear wheels RL and RR is an abnormal wheel, the processor 20 revises the turning angle of the corresponding normal wheel through the process of recalculating the turning angle of the rear wheels in FIG. 4.

On the other hand, when the rear wheels RL and RR are both normal wheels, the processor 20 recalculates the turning angles of both of the rear wheels RL and RR.

Here, the predetermined turning radius is defined as R, the turning direction is defined as sign(δ'cg), CW (Clock Wise) is defined as +1, CCW (Counter Clock Wise) is defined as −1, in-phase is defined as 1, and out-of-phase is defined as −1.

The fixed turning angle of the front wheels is defined as WA_F, and the recalculated turning angle of the rear wheels is defined as WA_R_REV. The turning angle of the rear left wheel, recalculated on the basis of the four wheels, is defined as WA_RL_REV, and the turning angle of the rear right wheel, recalculated on the basis of the four wheels, is defined as WA_RR_REV.

More specifically, the processor 20 decides whether the front wheels and the rear wheels are in-phase or out-of-phase on the basis of the turning direction.

In this case, the processor 20 decides that the front wheels are in-phase, when a value obtained by multiplying the predetermined turning direction of the front wheels by the fixed turning direction of the front wheels and −1 is 1, and decides that the rear wheels RR and RL are out-of-phase, when the value obtained by multiplying the predetermined turning direction of the front wheels by the fixed turning direction of the front wheels and −1 is −1.

For example, the processor 20 decides that the front wheels are in-phase (1), when the predetermined turning angle CW of the front wheels is 1 and the fixed turning direction CCW of the front wheels is −1, and decides that the front wheels are out-of-phase (−1), when the predetermined turning angle CW of the front wheels is −1 and the fixed turning direction CCW of the front wheels is −1.

Then, the processor 20 recalculates the turning angle of the center of gravity in consideration of the in-phase and the out-of-phase at the fixed turning angle of the front wheels FL and FR. The recalculated turning angle of the center of gravity is referred to as δ'cg_rev.

When the front wheels are in-phase, the processor 20 calculates the fixed turning angle WA_F of the front wheels FL and FR through Equation 51 below.

$$WA\_F = \tan^{-1}\left(\frac{Lf + c\_rev}{R_{r\_rev}}\right) \times \text{sign}(\delta'_{cg}) \qquad [\text{Equation 51}]$$

Here, when the turning angle WA_F of the front wheels FR and FL is equal to or less than the preset value which is not relatively large, the turning angle WA_F of the front wheels FR and FL is calculated as expressed by Equation 52 below.

$$WA\_F = \left(\frac{Lf + c\_rev}{R_{r\_rev}}\right) \times \text{sign}(\delta'_{cg}) \qquad [\text{Equation 52}]$$

Here, Rr_rev is equal to R×cos δ'cg_rev, and c_rev is equal to R×sin δ'cg_rev.

Therefore, the turning angle WA_F of the front wheels FR and FL is calculated as expressed by Equation 53 below.

$$WA\_F = \left(\frac{Lf + R \times \sin\delta'_{cg\_rev}}{R \times \cos\delta'_{cg\_rev}}\right) \times \text{sign}(\delta'_{cg}) \qquad [\text{Equation 53}]$$

Therefore, the turning angle δ'cg_rev of the center of gravity, recalculated in consideration of the in-phase and the out-of-phase at the turning angle WA_F of the front wheels FL and FR, is expressed as Equation 54 below.

$$\delta'_{cg\_rev} = \sin^{-1}\left(\frac{Lr \times \text{sign}(\delta'_{cg})}{R\sqrt{1+WA\_F^2}}\right) - \alpha \qquad [\text{Equation 54}]$$

$$\alpha = \sin^{-1}\left(\frac{WA\_F \times R}{R\sqrt{1+WA\_F^2}}\right)$$

Then, the processor 20 calculates the turning angle WA_Rrev of the rear wheels through the recalculated turning angle δcg_rev of the center of gravity.

In this case, the processor 20 calculates the turning angle WA_Rrev of the rear wheels through Equation 55 below. This may be equally applied to the in-phase and the out-of-phase.

$$WA\_R_{REV} = \tan^{-1}\left(\frac{c\_rev - Lr}{R_{r\_rev}}\right) \times \text{sign}(\delta'_{cg}) \qquad [\text{Equation 55}]$$

Here, Rr_rev is equal to R×cos δ'cg_rev, and c_rev is equal to R×sin δ'cg_rev.

When the determination result of step S60 in FIG. 2 indicates that the rear wheels RL and RR are both abnormal, the processor 20 determines that steering is impossible, and independently controls the driving forces of the respective wheels in step S90, in order to acquire an effect similar to steering.

Figure 16:
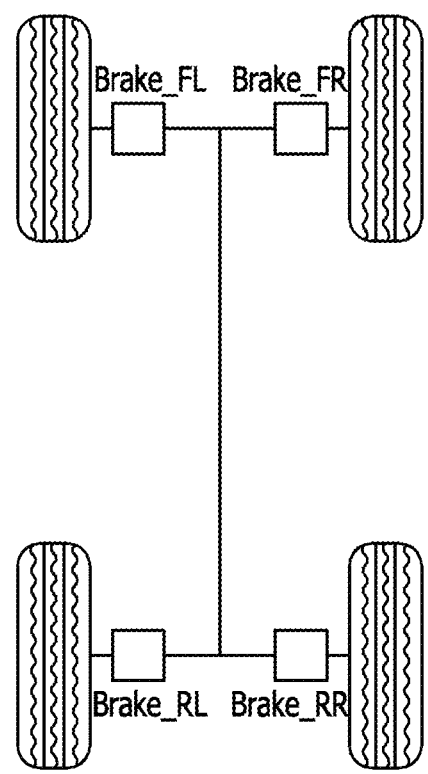
FIG. 16 is a diagram conceptually illustrating an example in which braking forces are controlled when steering is impossible in FIG. 2.

FIG. 16 is a diagram conceptually illustrating an example in which braking forces are controlled when steering is impossible in FIG. 2.

Referring to FIG. 16, when the processor 20 determines that steering is impossible, the wheel controller 30 distributes different braking forces Brake_FL, Brake_FR, Brake_RL, and Brake_RR to the respective four wheels FL, FR, RL, and RR. In this case, the angular velocities of the respective wheels may be controlled differently by the differences among the driving forces, which makes it possible to acquire an effect similar to steering.

The independent steering control apparatus and method in accordance with the embodiment of the present disclosure may control the vehicle to maintain the existing turning direction and the existing turning radius by adjusting the turning angles of normal wheels except abnormal wheels, even though the turning angles of the plurality of wheels are fixed due to faults thereof. Thus, the vehicle can maintain a behavior change similar to that before the faults occurred.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although the present disclosure has been disclosed with reference to the embodiments illustrated in the drawings, the embodiments are only for illustrative purposes, and those skilled in the art will appreciate that various modifications and other equivalent embodiments are possible therefrom. Therefore, the true technical scope of the present disclosure should be decided by the following claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An independent steering control apparatus for a vehicle comprising front and rear wheels, the apparatus comprising:
   a processor configured to analyze whether wheels are abnormal, based on turning angles of the respective wheels, and revise the turning angles of normal wheels, according to the analysis result, wherein the processor revises the turning angle of a normal wheel of the front wheels when any one of the front wheels is an abnormal wheel; and wherein the processor acquires an additional turning angle by subtracting the turning angle of the abnormal wheel of the front wheels from the turning angle of the normal wheel of the front wheels, calculates a final central angle by adding the additional turning angle to the turning angle of the normal wheel of the front wheels, calculates a turning radius of the vehicle based on the final central angle, and revises the turning angle of the normal wheel of the front wheels using the turning radius of the vehicle; and
   a wheel controller configured to control steering of the wheels according to the turning angles of the wheels input from the processor.

2. The independent steering control apparatus of claim 1, wherein the processor acquires an additional turning angle by subtracting the turning angle of the abnormal wheel of the rear wheels from the turning angle of the normal wheel of the rear wheels, calculates a final central angle by adding the additional turning angle to the turning angle of the normal wheel of the rear wheels, calculates a turning radius of the vehicle based on the final central angle, and revises the turning angle of the normal wheel of the rear wheels by using the turning radius of the vehicle.

3. The independent steering control apparatus of claim 2, wherein the processor determines whether the rear wheels are in-phase or out-of-phase, calculates the turning angle of the center of gravity based on the rear wheels, depending on whether the rear wheels are in-phase or out-of-phase, and revises the turning angle of the normal wheel of the front wheels based on the calculated turning angle of the center of gravity.

4. The independent steering control apparatus of claim 3, wherein the processor determines whether the rear wheels are in-phase or out-of-phase, by using a predetermined turning direction of the rear wheels and a fixed turning direction of the rear wheels.

5. The independent steering control apparatus of claim 1, wherein when both of the rear wheels are abnormal wheels and any one of the front wheels is an abnormal wheel, the processor calculates the turning angles of the abnormal rear wheels, revises the turning angle of the normal wheel of the front wheels, calculates the turning angle of a rear left wheel of the rear wheels based on a turning radius of the rear left wheel, calculates the turning angle of a rear right wheel of the rear wheels based on a turning radius of the rear right wheel, and calculates the turning angle of the rear wheels by averaging the turning angle of the rear left wheel and the turning angle of the rear right wheel.

6. The independent steering control apparatus of claim 1, wherein the processor calculates the turning angle of the front wheels and revises the turning angle of the normal wheel of the rear wheels when both of the front wheels are abnormal wheels and any one of the rear wheels is an abnormal wheel.

7. The independent steering control apparatus of claim 6, wherein the processor calculates the turning angle of a front left wheel of the front wheels based on a turning radius of the front left wheel, calculates the turning angle of a front right wheel of the front wheels based on a turning radius of the front right wheel, and calculates the turning angle of the front wheels by averaging the turning angle of the front left wheel and the turning angle of the front right wheel.

8. The independent steering control apparatus of claim 6, wherein the processor determines whether the front wheels are in-phase or out-of-phase, calculates the turning angle of a center of gravity based on the front wheels, depending on whether the front wheels are in-phase or out-of-phase, and revises the turning angle of the normal wheel of the rear wheels based on the calculated turning angle of the center of gravity, and
   wherein the processor determines whether the rear wheels are in-phase or out-of-phase, by using a predetermined turning direction of the front wheels and a fixed turning direction of the front wheels.

9. An independent steering control method for a vehicle comprising front and rear wheels, the method comprising:
   analyzing, by a processor, whether wheels are abnormal, based on turning angles of the respective wheels, and revising the turning angles of normal wheels according to the analysis result, wherein:
      when both of the rear wheels are abnormal wheels and any one of the front wheels is an abnormal wheel, the processor calculates the turning angles of the abnormal rear wheels, and revises the turning angle of the normal wheel of the front wheels, and
      wherein the processor calculates the turning angle of a rear left wheel of the rear wheels based on a turning radius of the rear left wheel, calculates the turning angle of a rear right wheel of the rear wheels based on a turning radius of the rear right wheel, and calculates the turning angle of the rear wheels by averaging the turning angle of the rear left wheel and the turning angle of the rear right wheel; and
   controlling, by a wheel controller, steering of the wheels according to the turning angles of the wheels input from the processor.

10. The independent steering control method of claim 9, wherein
   the processor revises the turning angle of a normal wheel of the front wheels, when any one of the front wheels is an abnormal wheel.

11. The independent steering control method of claim 10, wherein
   the processor acquires an additional turning angle by subtracting the turning angle of the abnormal wheel of the front wheels from the turning angle of the normal wheel of the front wheels, calculates a final central angle by adding the additional turning angle to the turning angle of the normal wheel of the front wheels, calculates a turning radius of the vehicle based on the final central angle, and revises the turning angle of the normal wheel of the front wheels by using the turning radius of the vehicle.

12. The independent steering control method of claim 10, wherein
the processor acquires an additional turning angle by subtracting the turning angle of the abnormal wheel of the rear wheels from the turning angle of the normal wheel of the rear wheels, calculates a final central angle by adding the additional turning angle to the turning angle of the normal wheel of the rear wheels, calculates a turning radius of the vehicle based on the final central angle, and revises the turning angle of the normal wheel of the front wheels by using the turning radius of the vehicle.

13. The independent steering control method of claim 9, wherein
the processor determines whether the rear wheels are in-phase or out-of-phase, calculates the turning angle of a center of gravity based on the rear wheels, depending on whether the rear wheels are in-phase or out-of-phase, and revises the turning angle of the normal wheel of the front wheels based on the calculated turning angle of the center of gravity.

14. The independent steering control method of claim 13, wherein
the processor determines whether the rear wheels are in-phase or out-of-phase, by using a predetermined turning direction of the rear wheels and a fixed turning direction of the rear wheels.

15. The independent steering control method of claim 9, wherein
when both of the front wheels are abnormal wheels and any one of the rear wheels is an abnormal wheel, the processor calculates the turning angle of the front wheels and revises the turning angle of the normal wheel of the rear wheels.

16. The independent steering control method of claim 15, wherein
the processor calculates the turning angle of a front left wheel of the front wheels based on a turning radius of the front left wheel, calculates the turning angle of a front right wheel of the front wheels based on a turning radius of the front right wheel, and calculates the turning angle of the front wheels by averaging the turning angle of the front left wheel and the turning angle of the front right wheel.

17. The independent steering control method of claim 15, wherein
the processor determines whether the front wheels are in-phase or out-of-phase, calculates the turning angle of a center of gravity based on the front wheels, depending on whether the front wheels are in-phase or out-of-phase, and revises the turning angle of the normal wheel of the rear wheels based on the calculated turning angle of the center of gravity,
wherein the processor determines whether the rear wheels are in-phase or out-of-phase, by using a predetermined turning direction of the front wheels and a fixed turning direction of the front wheels.

18. An independent steering control apparatus for a vehicle comprising front and rear wheels, the apparatus comprising:
a processor configured to analyze whether wheels are abnormal, based on turning angles of the respective wheels, and revise the turning angles of normal wheels, according to the analysis result, wherein the processor revises the turning angle of a normal wheel of the front wheels when any one of the front wheels is an abnormal wheel; and wherein the processor acquires an additional turning angle by subtracting the turning angle of the abnormal wheel of the rear wheels from the turning angle of the normal wheel of the rear wheels, calculates a final central angle by adding the additional turning angle to the turning angle of the normal wheel of the rear wheels, calculates a turning radius of the vehicle based on the final central angle, and revises the turning angle of the normal wheel of the rear wheels by using the turning radius of the vehicle; and
a wheel controller configured to control steering of the wheels according to the turning angles of the wheels input from the processor.

\* \* \* \* \*